No. 709,611. Patented Sept. 23, 1902.
W. L. SILVEY.
SECONDARY BATTERY.
(Application filed Feb. 8, 1902.)
(No Model.) 3 Sheets—Sheet 1.
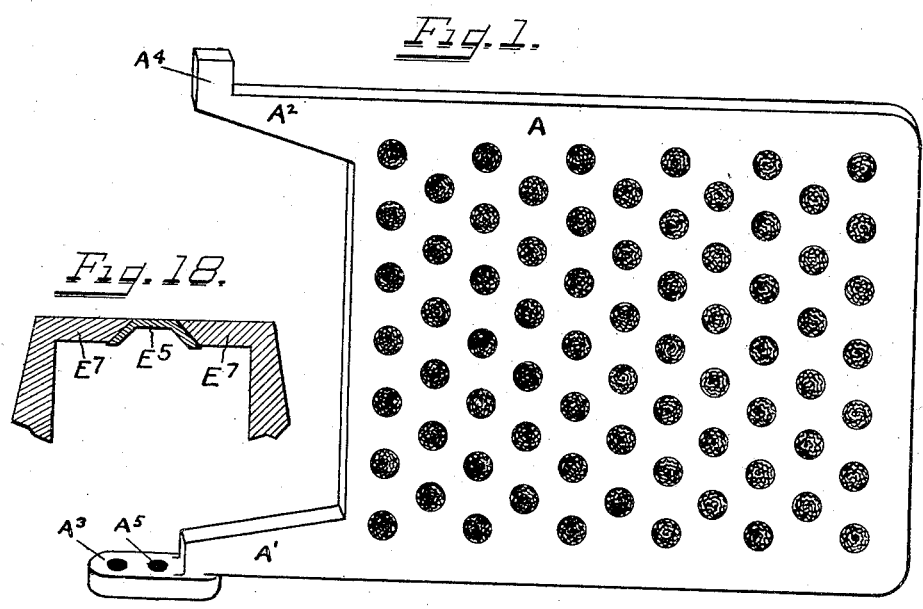
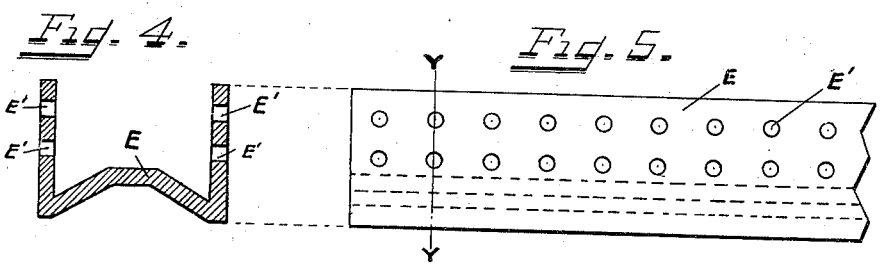
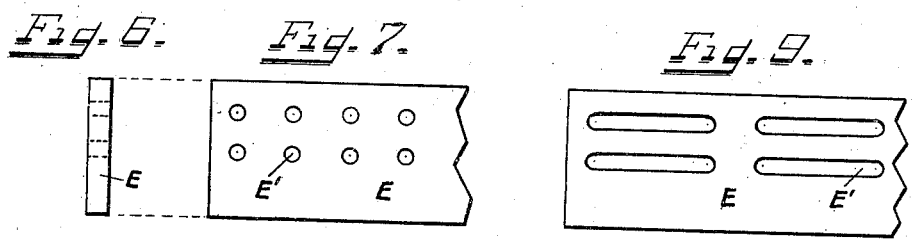
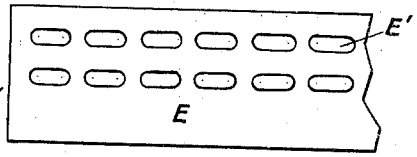
Attest
Frederick E. Keeley
E. B. Lehman
Inventor
William L. Silvey

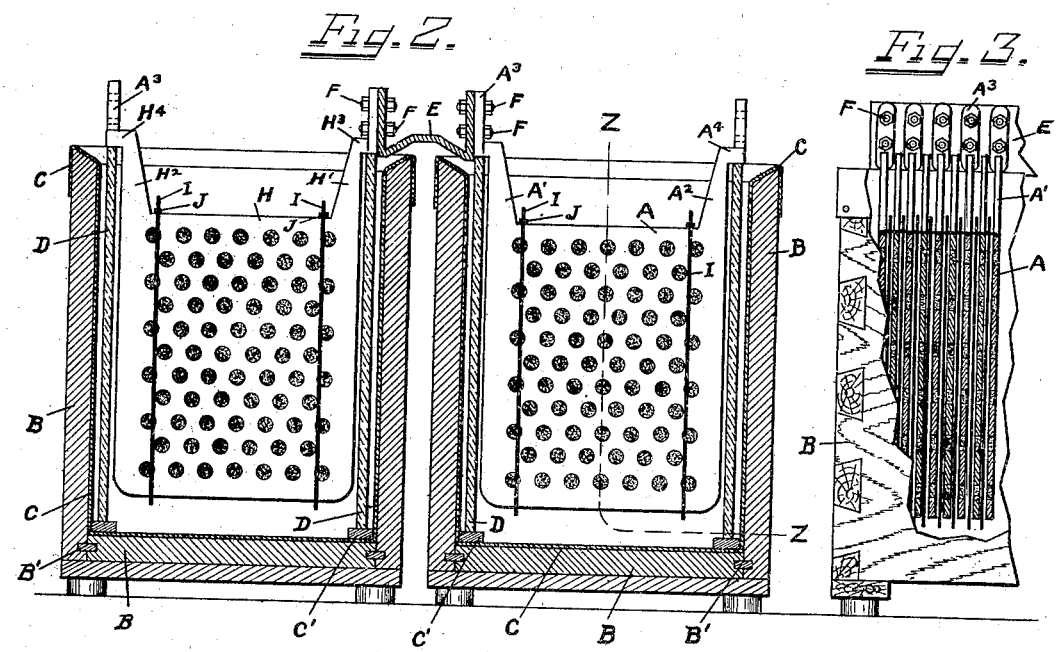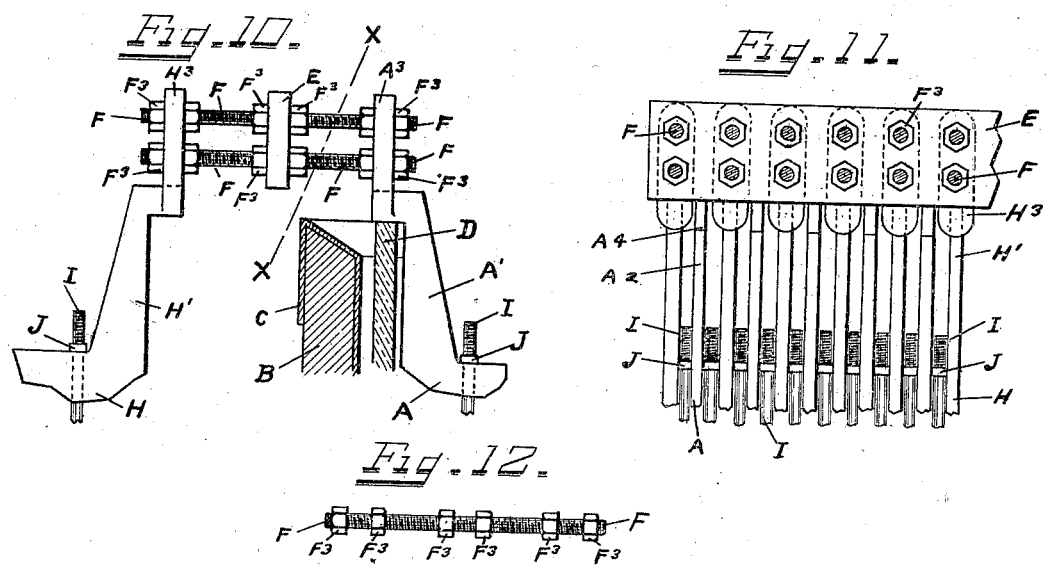

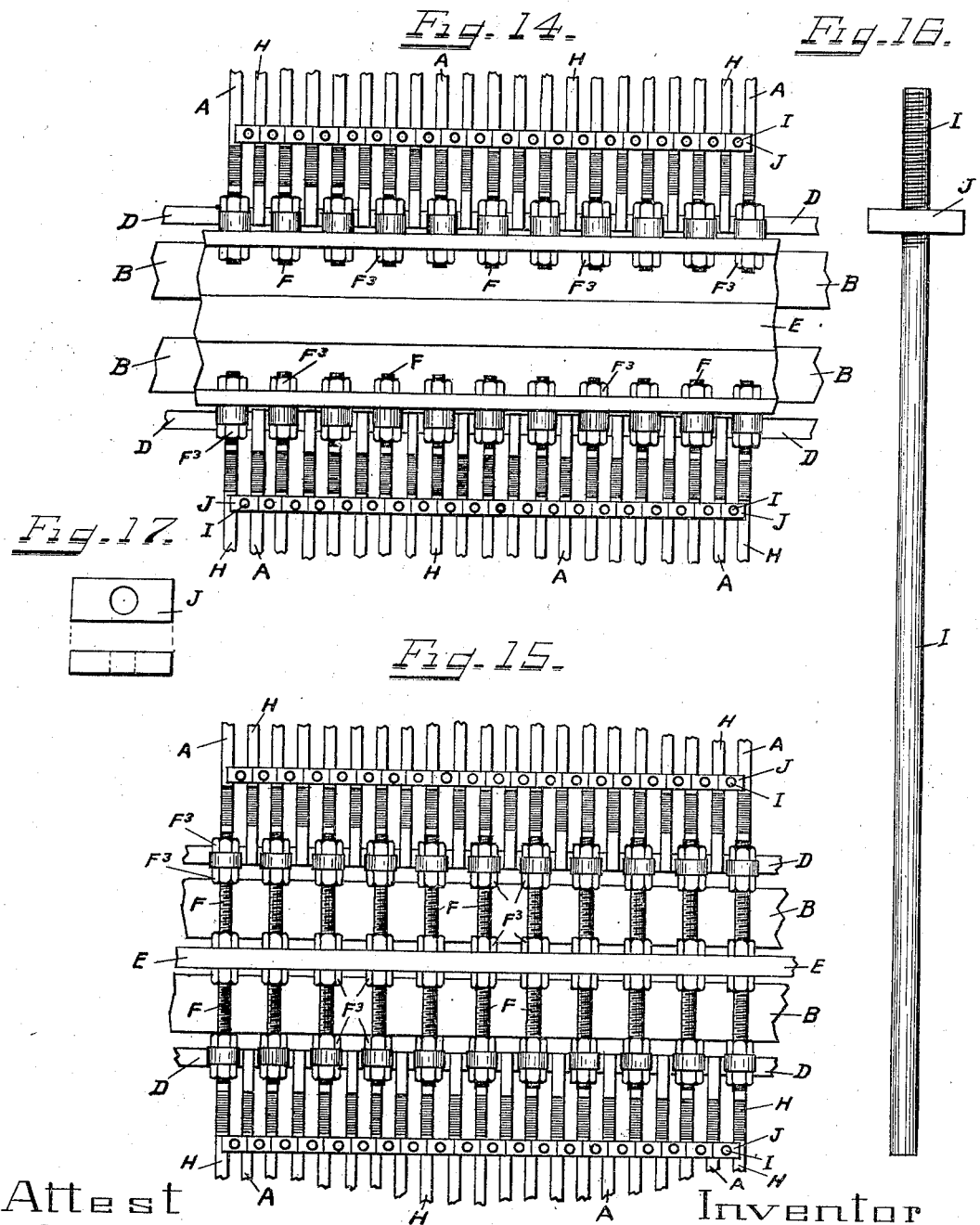

UNITED STATES PATENT OFFICE.

WILLIAM L. SILVEY, OF DAYTON, OHIO.

SECONDARY BATTERY.

SPECIFICATION forming part of Letters Patent No. 709,611, dated September 23, 1902.

Application filed February 8, 1902. Serial No. 93,175. (No model.)

*To all whom it may concern:*

Be it known that I, WILLIAM L. SILVEY, a resident of the city of Dayton, in the county of Montgomery and State of Ohio, have invented certain new and useful Improvements in Secondary Batteries; and I do hereby declare that the following is a full, clear, and exact description of the same, reference being had to the accompanying drawings, and to the letters of reference marked thereon, which form a part of this specification.

My invention relates to the construction of secondary batteries, more especially to the details whereby they may be more perfectly arranged, easier assembled, and taken apart for repairs than has heretofore been possible.

My invention relates to secondary batteries, especially of the larger type, such as are used for central-station and street-railway power purposes; and it is the object of this invention to so construct the plates as to enable this desirable feature to be accomplished in the simplest possible manner.

Referring to the accompanying drawings, which are made a part hereof, in which similar letters of reference refer to similar parts throughout, Figure 1 is a perspective side elevation of a complete battery-plate embodying features of my invention. Fig. 2 is a cross-section of two battery-cells, illustrative of my improvements. Fig. 3 is a broken longitudinal section of a part of a battery-cell embodying my improvements as outlined by the section-line Z Z in Fig. 2. Fig. 4 is a cross-section of a connecting or equalizing bar E, whereby the plates are connected together from one element to another and whereby the plates in each cell of the positive or negative polarity are joined together to make the element complete. This section is taken along the vertical line Y Y of Fig. 5. Fig. 5 is a horizontal side elevation of a part of a connecting-bar E. Fig. 6 is an end view of a modified form of the connecting-bar E. Fig. 7 is a side elevation of a part of the connecting-bar E as shown in Fig. 6; and Fig. 8 is a further modification showing the holes through which the bolts pass, the holes being made oblong to allow for variation in the thickness of the plates, and other features, which will be apparent upon examination of the drawings. Fig. 9 represents a side elevation of a connecting-bar E, showing the holes through which the bolts pass, the holes being made oblong to allow for variation in the thickness of the plates and to allow the plates to be adjusted with relation to each other. Fig. 10 represents two battery-plates connected together by means of long bolts passing through lugs $A^3$ on top of the battery-plates, the equalizing-bar E lock-bolted on the center of the rod, as shown. Fig. 11 represents the battery-plates of one polarity (either positive or negative) bolted to the equalizing-bar E and separating-rods I for preventing the plates A H of opposite polarity from coming in contact with each other. It will be observed in this figure that the bolts are broken off along the dotted line X X in Fig. 10. Fig. 12 is a perspective view of the long bolt by which the battery-plates are connected together, as shown in Fig. 10. Fig. 13 represents the bolt F used for connecting the positive and negative plates to the equalizing-bar E, as shown in Figs. 2 and 3. Fig. 14 represents a part of the plates of one cell connected to a part of the plates of another cell by means of the equalizing-bar E, the plates being broken off, but showing the lugs and ears in their proper relative position, the ears of the plates of one polarity in one cell being bolted to the ears of plates of opposite polarity in the other cell by means of the bolts F, which pass through the holes $A^5$ in the lugs $A^3$, these lugs being attached and made a part of the hanger or hook at one side of the plate, as shown in Figs. 3, 11, 14, and 15. These figures also represent the relation of the positive to the negative plates A H and whereby they are maintained in one position by means of the separating-rods I. Fig. 15 represents a modification of Fig. 14, in which the bolt F is made continuous from one cell to the other and with the equalizing-bar E mounted on the rods, as shown in Fig. 10. Fig. 16 represents the separating-rod I as shown in position in Figs. 2, 3, 6, 7, 14, and 15. The upper end of the rod is threaded for the reception of an insulating-plate J. Fig. 17 is a further representation of the plate J, the purpose of the plate being to support the separating-rod I and prevent it from dropping out of position between the battery-plates.

Heretofore it has been customary to either electrically weld or lead-burn the battery-plates to the connecting or equalizing bar, as illustrated in Fig. 18. To accomplish this requires a great deal of skill and experience, so that the ordinary battery-man is seldom able to apply new plates to old batteries or to remove old or worn-out plates and insert new ones when necessary, and very often in case of breakdown or disarrangement of the plates, (in plants which have been in use a considerable time,) where it becomes necessary to make repairs or insert new plates, experts have to be sent from the factory to plants often at a great distance to repair the cells or insert new plates. Owing to this fact that the ordinary battery-man cannot do his own repairing, it is the primary object of this invention to so construct the batteries as to enable any battery-man of ordinary intelligence to make his own repairs and with but little necessary apparatus. Batteries in which the plates are welded or burned fast to the equalizing-bar $E^5$, as shown by Fig. 18, must have the bar $E^5$ so designed as to allow a close union between the lug $E^7$ on the plate and the bar. To accomplish this, it has been found necessary to so incline the face of the bar that it is joined at an angle of forty-five degrees, and the lug is also made at an angle of forty-five degrees, which allows for variations in the height and position of the plate, either vertical, horizontal, or lateral.

Referring to Figs. 1, 2, 3, 10, and 11 of the drawings, it will be seen that the hanger $A'$ on one side of the battery-plate at the top has a projecting lug $A^3$, through which holes or receptacles $A^5$ are drilled or cast. The purpose of these holes is for the passage of bolts F, by which the battery-plate is connected to an equalizing-bar E, the bolt passing through the holes $E'$ in the bar. These holes may be either round, as shown in Figs. 4, 5, 7, and 11, or they may be slotted, as shown in Figs. 8 and 9. In case the holes are slotted it is merely to allow certain adjustment of the plates with relation to each other. In order to connect a series of battery-plates to the equalizing-bar, it may be accomplished as shown in Figs. 2, 3, 11, 14, and 15, by which it will be seen that the metal bolt F passes through the lug on the battery-plate and through the metal equalizing bar or rail E, and by tightening up the metal nut on the bolts perfect metallic contact between the plate and the bar is secured without the necessity of burning or soldering them together, and in case it becomes necessary to remove one or all of the plates for any cause the removal of the bolts allows it to be done in a very short time. All that is necessary is to see that the surfaces of the lug on the plate and the equalizing-bar are parallel (or nearly so) with each other.

It will be observed by an examination of Figs. 2 and 14 that the equalizing-bar E is made grooved, as shown in section of Fig. 4, the bolts E passing through the side walls. They are made thus to avoid the use of a long bolt, and in case the equalizing-bar E is made thus the bolt F, Fig. 13, is employed, and then the cell appears connected as shown in the partial plan view Fig. 14. There are times when this construction is not expedient, and in such case the long bolt F, Fig. 12, is employed and the cells are connected as shown in Fig. 10 and in the partial plan view Fig. 15. In this case the equalizing-bar is made as shown in the end view Fig. 10 and as in the partial plan view Fig. 15. The bolts F pass through the holes $A^5$ in the extension of $A^3$ on the plate A, (shown in enlarged view, Fig. 1, with a nut $F^3$ for clamping the bolt to the lug $A^3$,) the bolt extending from one cell to the next adjoining, as shown in Fig. 15. The equalizing-bar is clamped to these bolts at the center by nuts $F^3$, as shown in Figs. 10 and 15. The equalizing-bar E is clamped to the bolts near the center by means of jam-nuts on each side of the bar, the nuts being threaded on the long bolt F, as shown in Figs. 10 and 15. This bolt, with all the nuts in place, is further illustrated in Fig. 12. It will be observed upon examination of Figs. 10 and 15 that this is a most convenient manner of connecting battery plates and cells together, for any plate may be removed or replaced by another plate by simply loosening these nuts and withdrawing the bolt, which allows the plate to become separated from the connecting-bar and the plate in the adjoining cell. The battery-plates are held in place and supported with relation to each other in the cell by being hung on insulating-plates D by the ears $A^3$ $A^4$, as shown in Figs. 2 and 10. The plates are further separated from each other by means of the hard-rubber separating-rod I, the top end of the rod being threaded for the reception of the insulating-plate J. The plates J are made to adjoin each other, as shown in Figs. 14 and 15, the purpose of the plate J being to prevent the rod from dropping out of place between the positive and negative battery-plates A H, (all the plates being made alike mechanically, except that the positive plates are represented by the letter A and the negative plates by the letter H,) and in case it becomes necessary to remove either of these plates the separating-rod I is simply lifted out of the cell by means of the threaded extension J of the upper end of the rod, this extension being made long enough to extend above the electrolyte.

The battery-jar B is made, after the usual manner of cell, with dovetailed corners and supported upon insulators, as shown in Fig. 2. The jar is made beveling at the top, as shown in Figs. 2 and 10, which allows the vapor which is carried over the surface of the electrolyte during the charge to run back into the inside of the jar. The jar is protected from the destructive effects of the acid by means of a lead lining C. The insulating-plates D, on which the battery-plates are supported, are prevented from cutting through the lining in the jar by means of the strip C', as shown in Fig. 2.

Having fully described the important features of my invention, what I claim as new, and wish to secure by Letters Patent in the United States, is—

1. In a secondary battery the combination of a battery-plate having supporting-ears with a lug on one of the ears, a bolt passing through the lug and provided with a screw-thread, a nut for clamping the bolt to the lug, an equalizing-bar, the bolt extending into the equalizing-bar and nuts for clamping the equalizing-bar and the bolt together independent of the lug as set forth.

2. In a secondary battery, the combination of two battery-plates having supporting-ears, a lug on the ear of each plate, an equalizing-bar between the ears, and bolts passing through the lugs and equalizing-bar, and nuts for clamping the lugs and equalizing-bar to the bolts, as set forth.

3. In a secondary battery, the combination of a battery-plate having supporting-ears, a lug on one of the ears, support-plates on which the battery-plates are hung by means of the ears and an equalizing-bar, a battery-bolt and nuts, the bolt clamped to the lug and the equalizing-bar by means of the nuts as set forth.

4. In a secondary battery, the combination of a battery-plate having ears for the support of the plate, a lug on one of the ears, the lug having a hole in it, a screw-threaded rod in the hole, an equalizing-bar with a hole in it, the rod extending from the lug on the plate to the equalizing-bar and means for clamping the rod to the lug on the plate and the equalizing-bar as set forth.

5. In a secondary battery, the combination with the battery-plate of supporting hanger-ears for the plate, one of the ears having a lug, the lug having a hole in it and an equalizing-bar, the bar connected to the lug on the plate by means of a rod extending from the lug on the plate to the equalizing-bar as set forth.

6. In a secondary battery, the combination with the body of the plate of ears at the top of the plate, the ears having hooks for supporting the plate, a lug on one of the ears, the lug having a receptacle in it and a screw-threaded rod and equalizing-bar, the equalizing-bar and lug on the plate connected together through the intermediate screw-threaded rod, as set forth.

7. In a secondary battery, the combination with the body of the plate A of hanger-ears, a hook on one of the hangers, a lug on one of the ears, a hole in the lug, a rod and connecting-bar the rod extending from the lug to the connecting-bar and plates for supporting the plate A and a battery jar or cell for supporting the battery-plates and battery-plate supports as set forth.

8. In a secondary battery, the combination of a battery-plate, hangers on the plate, ears on the hangers, a lug on one of the ears, an equalizing and distributing bar E and a rod F, the rod extending from the equalizing-bar to the lug and clamps for maintaining the lug and the rod and the rod and equalizing-bar in close metallic contact, as set forth.

9. In a secondary battery, the combination of an equalizing and distributing bar E bolt F, nuts $F^3$ with a battery-plate, the plate having hangers, ears on the hangers, a lug on one of the ears, the bolt F extending from the lug to the equalizing-bar, the nuts clamping the bar to one end of the bolt, the other end of the bolt clamped to the lug on the battery-plate, as set forth.

10. In a secondary battery, the combination of an equalizing and distributing bar E bolt F nuts $F^3$ with a battery-plate, the plate having hangers, ears attached to the hangers, a lug on one of the ears, the bolt extending from the lugs to the equalizing-bar, the nuts clamping the bar to one end of the bolt, the other end of the bolt being clamped to the lug on the battery-plate, as set forth.

In testimony whereof I have set my hand in the presence of two subscribers.

WILLIAM L. SILVEY.

Witnesses:
 FRANK BUCHANAN,
 E. R. KIRBY.